United States Patent
Reuter et al.

(10) Patent No.: US 6,226,717 B1
(45) Date of Patent: May 1, 2001

(54) SYSTEM AND METHOD FOR EXCLUSIVE ACCESS TO SHARED STORAGE

(75) Inventors: James M. Reuter, Colorado Springs, CO (US); Leslie Lamport; Eliezer Gafni, both of Palo Alto, CA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/244,955

(22) Filed: Feb. 4, 1999

(51) Int. Cl.[7] .............................. G06F 12/00; G06F 13/00
(52) U.S. Cl. ...................... 711/147; 711/148; 711/154; 711/167
(58) Field of Search ................................. 711/100, 147, 711/148, 150, 152, 154, 167

(56) References Cited

U.S. PATENT DOCUMENTS

| | | | |
|---|---|---|---|
| 5,056,015 | * 10/1991 | Baldwin et al. | 712/200 |
| 5,428,754 | * 6/1995 | Baldwin | 712/200 |
| 5,761,731 | * 6/1998 | Van Doren et al. | 711/155 |
| 5,809,340 | * 9/1998 | Bertone et al. | 710/52 |
| 5,822,533 | * 10/1998 | Saito et al. | 709/224 |
| 5,956,522 | * 9/1999 | Bertone et al. | 710/52 |
| 6,047,355 | * 4/2000 | Wu et al. | 711/119 |
| 6,065,102 | * 5/2000 | Peters et al. | 711/151 |

OTHER PUBLICATIONS

"A Fast Mutual Exclusion Algorithm" By Leslie Lamport, ACM Transactions on Computer Systems, vol. 5, No. 1, Feb. 1987, pp. 1–11.

"Timing–Based Mutual Exclusion" by Nancy Lynch and Nir Shavit, IEEE Real–Time Systems Symposium, Dec. 1992, p. 2–11.

Article Entitled "The Part–Time Parliament" By Leslie Lamport 1998 ACM.

\* cited by examiner

*Primary Examiner*—Tuan V. Thai
(74) *Attorney, Agent, or Firm*—William J. Kubida; Hogan & Hartson LLP (57) ABSTRACT

A system and method exclusively accesses a shared storage location using a shared algorithm. Competing processors follow the algorithm for reserving exclusive access to the shared storage location. Those competing processors that have not successfully reserved exclusive access honor the reservation of the successful processor and delay their own access attempts. Two critical storage blocks and two delay times are typically used during an attempt to reserve exclusive access for a processor.

35 Claims, 5 Drawing Sheets

SYSTEM AND METHOD FOR EXCLUSIVE ACCESS TO SHARED STORAGE

BACKGROUND OF THE INVENTION

1. Field of the Invention

The present invention pertains generally to dynamic magnetic information storage and retrieval and more particularly to systems and methods used in controlling the electronic circuitry through which the information signal is processed.

2. Description of Related Art

A computer system generally includes at least one processor to perform computations and control components coupled to the computer system. Some computer systems include multiple processors that access shared resources within the computer system. For example, multiple processors may individually access a shared hard disk, a shared I/O channel, a shared peripheral, or a shared memory space to perform a particular function. Furthermore, such multiprocessors may access shared resources to communicate with other processors within the computer system. It is common, for example, for a processor to store data intended for another processor in a shared memory location. Thereafter, the other processor can read the data from the shared memory location.

It is common for multiple processors in a computer system to share a storage location, for example, in a database stored on a hard disk. Preferably, access to the shared storage location is coordinated to provide exclusive access to the shared storage location by any single processor. Otherwise, one processor may independently modify the content of the shared storage location without notice to another processor accessing the shared storage location at approximately the same time. Such processors are termed "competing processors", in that they are competing for access to a shared storage location. A possible result of non-exclusive access to a shared storage location by competing processors is that corrupted or unintended data may be read or stored in the shared storage location by one of the processors.

Existing approaches for providing exclusive access to shared storage may be divided into at least four categories. These solutions can be compared based on their safety (i.e., the ability to provide mutual exclusion in all practical situations) and their freedom from deadlock. A deadlock, very simply, is a condition in which two or more processors wait for each other to release a shared resource before resuming their execution. Deadlock occurs if a processor attempts to initiate exclusive access to a shared storage location, but it and all other competing processors are thereafter denied exclusive access because at least two competing processors continually start, abort, and restart their attempts to gain exclusive access. Because all processors participating in a deadlock are suspended and cannot resume execution, they cannot therefore release the resources they own.

A first category of solutions involves exclusive access approaches that assume the set of processors requiring exclusive access to the shared storage is known in advance. In many applications, this assumption is not valid. Particularly in applications where the number and identity of the processors is dynamic to enable system scaling, such solutions are unsuitable for many uses.

Another category of solutions, that generally do not require knowledge of the set of processors eligible to compete for exclusive access to a shared memory location depend on timing characteristics of the storage subsystem. By this it is meant that the solutions only perform properly when the physical implementation of the storage subsystem behaves within predicted timing constraints. Accordingly, such solutions suffer from safety problems if the storage subsystem fails to satisfy the timing constraints. These solutions also mitigate against system scalability because as systems scale by adding new devices the timing behavior of the system may change.

Fischer's algorithm is an example of such a solution. In Fischer's algorithm the processor requesting exclusive access executes a delay operation, called a "race wait delay" before exclusive access is actually obtained or assumed. In other words, the race wait delay is a delay between the request for a mutex lock and the time that the resource is actually locked.

Each processor requesting the lock must first check the state of the lock, then assert control over the lock, then wait, then verify that it in fact remained in control of the lock for the wait period. Only after the wait period has elapsed and the verification step is complete can the requesting processor be assured that the lock has been obtained. In a race condition, for example, first and second processors both check the state of the lock at essentially the same time. This does not have to be simultaneous. Whenever the second processor checks the lock state before the first processor has assumed control, the check will reveal that the lock is available. Conversely, a race condition exists whenever the first processor asserts control over the lock at a time that is too late for the second processor to detect.

In a race condition described above, the second processor will override the first processor and take control of the lock for itself. Because the first processor must wait for the race wait delay, it will not attempt to, for example, write data to the shared resource until it has waited and then verified that it remains in control of the lock. In the race condition described above, the first processor will detect that it has lost control of the lock, and will have to wait and arbitrate for control of the lock later.

The race wait delay is a delay added to enable competing processors to self-arbitrate for access to the shared resource. Essentially, the race wait delay is a time period of sufficient length to ensure that in a race condition one or the other of competing processors detect the other processor's access attempt. In this manner, each processor that detects another processor's attempt can delay its own attempt at exclusive access.

A system operation in accordance with Fischer's algorithm never deadlocks, but safety is compromised if the timing constraints are not met. As such, to guarantee safety requires increasing the race wait delay to be at least as long as the longest foreseeable access latency experienced by the storage subsystem. This is an impractical burden in many applications and makes the system difficult to scale when such scaling results in access latency that violates the race wait delay assumed by the algorithm.

Solutions that do not depend on timing constraints suffer from potential deadlock when a race exists between two processors. An example of such a solution is the Fast Mutual Exclusion Algorithm, described by Leslie Lamport, in ACM Transactions on Computer Systems, Vol. 5, No. 1, February 1987, Pages 1–11.

Another class of solutions rely on particular properties of the shared storage interconnects. For example, SCSI disk subsystems can use the "SCSI Reserve" and "SCSI Unreserve" semantics to provide exclusive access to a disk. These types of solutions are not ideal because they narrowly apply to a particular disk subsystem and do not extend or scale to alternate storage subsystems.

Accordingly, need exists for a system and method for providing exclusive access to shared storage that does not rely on advance knowledge of the set of processors potentially accessing the shared storage. Furthermore, need exists for an exclusive access solution that accommodates competing processors without deadlock, accommodates the unpredictable timing properties of a shared storage subsystem, and does not rely on particular properties of any particular shared storage subsystem.

SUMMARY OF THE INVENTION

Briefly stated, the present invention involves a system and method for providing exclusive access to a shared storage location by a selected processor in a system having multiple processors. The shared storage location is associated with first and second critical storage blocks. A processor identifier associated with the selected processor is stored in the first critical storage block.

It is an advantage of an embodiment of the present invention that it provides exclusive access to a shared storage location to a dynamic set of competing processors. Furthermore, an embodiment of the present invention does not rely on particular properties of any particular shared storage subsystem. Accordingly, the shared storage subsystem may be dynamically grown and changed to have new timing characteristics.

A system and method embodiment of the present inventions provides safe and timely behavior when a storage subsystem behaves with expected read and write times, and provides safe behavior when the storage subsystem does not behave with the expected read and write times. The only time constraint that is preferably honored by an embodiment of the present invention and an underlying disk subsystem is a "crash detect delay" to determine when a processor has crashed when holding or attempting to reserve exclusive access. This relatively long timing constraint is asserted only in infrequent cases and therefore does not introduce a significant performance penalty in exchange for safety.

Additional advantages and novel features of embodiments of the invention are set forth in the description that follows and will become more apparent to those skilled in the art when taken in conjunction with the accompanying drawings. The advantages of embodiments of the invention may be realized and attained by means of the instrumentalities and accommodations particularly pointed out in the appended claims.

To achieve the foregoing, as embodied and broadly described herein, a system embodiment of the present invention includes a storage device storing a value representing a race wait delay setting and a shared storage location associated with a first critical storage block and a second critical storage block. A processor coupled to the storage device and the shared storage location, is configured to wait for the first critical storage block and the second critical storage block to be available. After the first critical storage block and the second critical storage block are available the unique processor identifier is stored in the first critical storage block. If the processor identifier remains stored in the first critical storage block for a duration of a race wait delay and if the second critical storage block remains available the processor identifier is stored in the second critical storage block. In this manner the processor knows that it has exclusive access to the storage location, if the processor identifier remains stored in the first critical storage block after storing the processor identifier in the second critical storage block.

Another embodiment of the present invention comprise a method for providing exclusive access to a shared storage location for a first processor in a system having multiple processors. The first processor waits for a first critical storage block and a second critical storage block to be available, where both critical storage blocks are associated with the shared storage location. A processor identifier associated with the first processor is stored in the first critical storage block, after the first critical storage block and the second critical storage block are available. The processor identifier is stored in the second critical storage block, if the processor identifier remains stored in the first critical storage block for a duration of a race wait delay and if the second critical storage block is available. The first processor is provided with exclusive access to the shared storage location if the processor identifier remains stored in the first critical storage block after the operation of storing the processor identifier in the second critical storage block.

DETAILED DESCRIPTION OF A PREFERRED EMBODIMENT

The present invention is described in terms of a particular application for multiple, distributed storage systems that are shared amongst a number of distributed processors. The present invention is particularly useful in clustered systems where processors share disk storage and must coordinate use of that disk storage with minimal overhead and high reliability.

More generally, the present invention is useful in any parallel and multithreaded processing environment that involves multiple processes or threads of execution that programmatically access and manipulate shared resources, including disk storage. Many of these shared resources can support access to only a single process at any given time. Although a data storage device can be used as an example, more generally any resource can be represented as an "object" that is accessed by an executing process or thread. It is often desirable to provide mutual exclusion ("mutex") locks on processing resources that can only be used by a single process at any given time. These mutex locks are desirably implemented with as little overhead (i.e., additional processing) as possible.

The system and method of the present invention implement a mutex lock that enables processes and/or processors competing for a shared resource to detect and resolve race conditions without undue overhead. The present invention also enables competing processors to detect a crash condition that is causing one processor to refuse to release a lock on the shared resource. The crash detection feature allows an incoming processor to seize control of the lock when a crash is detected to prevent crash-induced deadlock. Another important feature of the crash detect feature of the present invention is that it allows a processor that has crashed to restart and resume control of the lock in a manner that prevents other processors from prematurely preempting the restarting processor. These useful features and advantages of the present invention will be described in greater detail hereinbelow.

Figure 1:
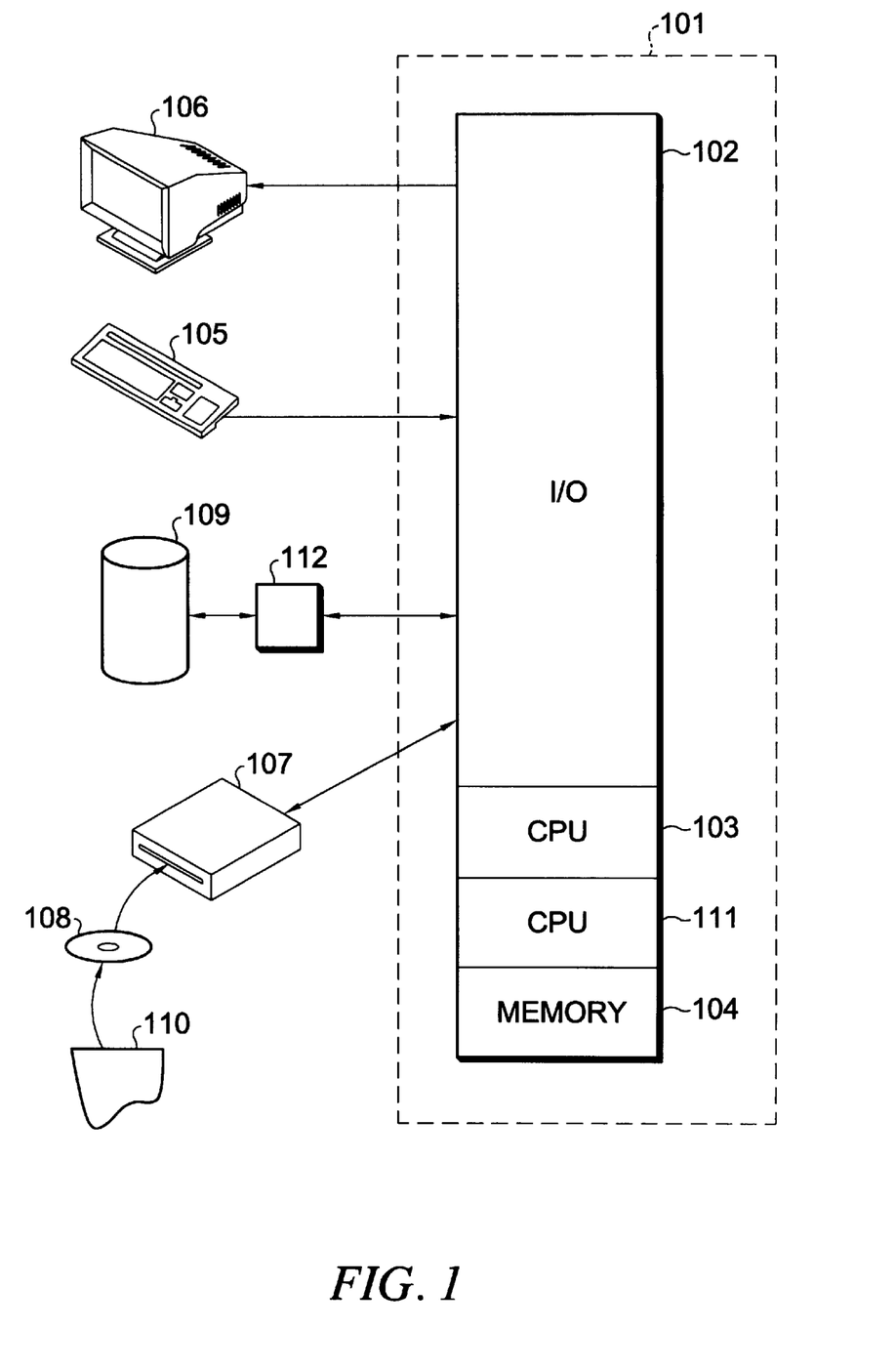
FIG. 1 depicts a general purpose computer in accordance with the present invention.

One operating environment in which the present invention is potentially useful encompasses the general purpose programmable computer. In such a system, data and program files may be input to the computer, that reads the files and executes the programs therein. Some of the elements of a general purpose computer are shown in FIG. 1, wherein a processor subsystem 101 is shown having an input/output (I/O) section 102, Central Processing Unit (CPU) 103, and a memory section 104. As illustrated, the processor subsystem 101 further includes an additional CPU 111, which may share access with CPU 103 to a storage location, such as in the memory section 104 and the storage unit 109. An embodiment of the present invention is preferably implemented in a controller chip or subsystem 112 for providing exclusive access to a shared storage location. In the illustrated embodiment, processors 103 and 111 are coupled through I/O section 102 to controller chip 112 to gain exclusive access to a shared storage location in storage unit 109. Alternately, a controller subsystem for providing exclusive access to a shared storage location may be incorporated into I/O section 102. Another alternate embodiment of the present invention is implemented in software devices loaded in memory 104 and/or stored on a configured CD-ROM 108 or storage unit 109 thereby transforming the computer system in FIG. 1 to a special purpose machine for implementing the present invention.

The I/O section 102 is connected to keyboard 105, display unit 106, disk storage unit 109, and disk drive unit 107. Generally, in contemporary systems, the disk drive unit 107 is a CD-ROM driver unit capable of reading the CD-ROM medium 108, that typically contains programs 110 and data. Computer program products containing mechanisms to effectuate the apparatus and methods in accordance with the present invention may reside in the memory section 104, on a disk storage unit 109, or on the CD-ROM medium 108 of such a system. Alternatively, disk drive unit 107 may be replaced or supplemented by a floppy drive unit, a tape drive unit, or other storage medium drive unit. Examples of such systems include VAX and ALPHA systems and personal computers offered by Compaq Computer Corporation, personal computers offered by other manufacturers, and other systems running a UNIX-based or other operating system. In accordance with the present invention, software modules may be executed by processor 103, and shared storage may be implemented in disk storage unit 109, disk drive unit 107 or other storage medium units coupled to the system.

Figure 2:
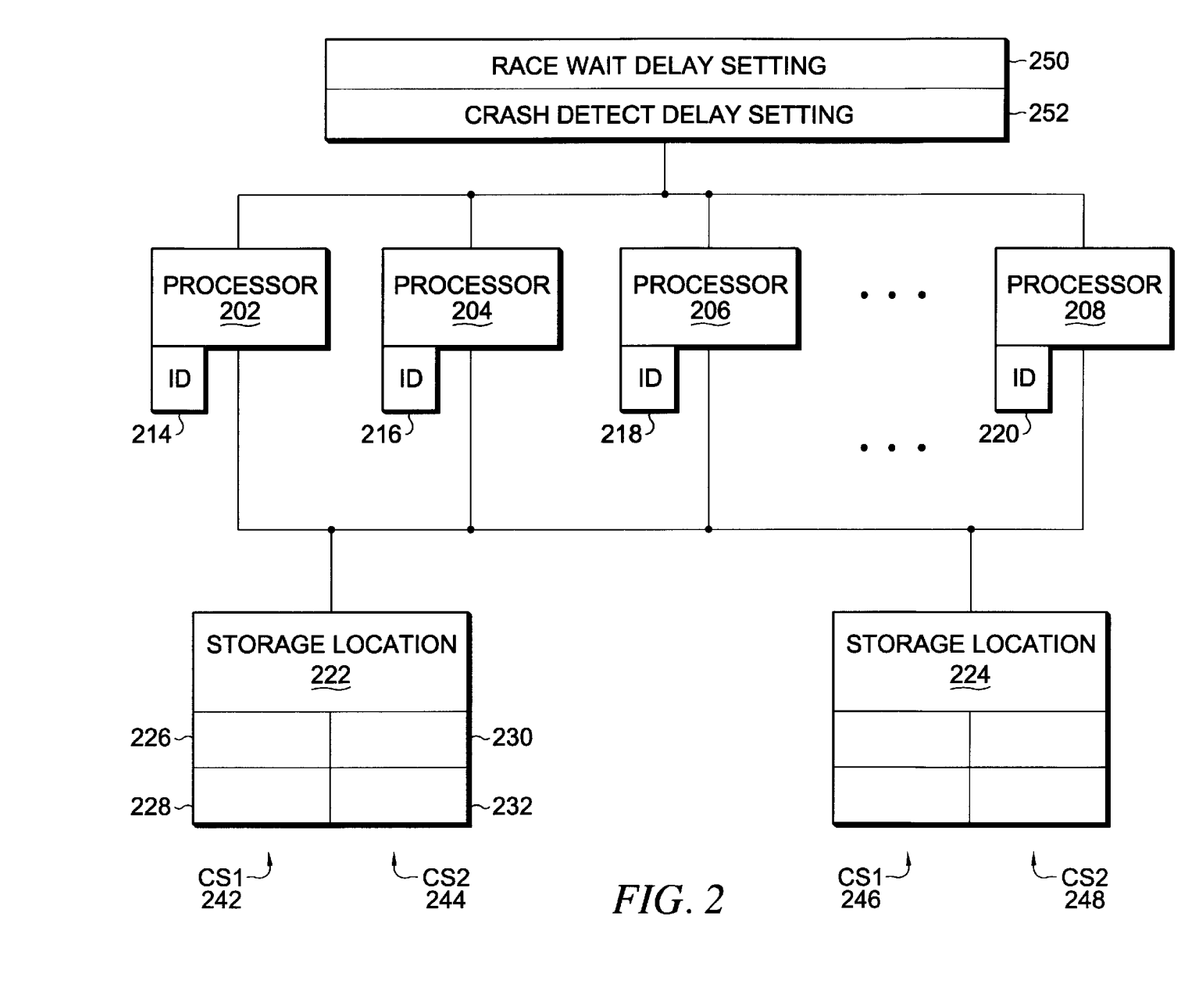
FIG. 2 depicts a block diagram of an exemplary system for providing exclusive access to a shared storage location in accordance with the present invention.

FIG. 2 depicts a block diagram of an exemplary system for providing exclusive access to a shared storage location. Competing processors 202, 204, 206, and 208, as well as any additional competing processors (not shown) represent processors having coordinated access to shared storage location 222. Processor 202 is associated with processor identifier ("ID") 214, that uniquely identifies the processor from all other processors having access to shared storage location 222. Likewise, processor 204 is associated with ID 216, processor 206 is associated with ID 218, and processor 208 is associated with ID 220. Any other processors having access to shared storage location 222 are also be associated with a unique identifier.

In an exemplary embodiment in accordance with the present invention, the set of processors is preferably dynamic. That is, the set of competing processors is not statically defined in advance. In contrast, processors may enter or leave the set of competing processors at any time. It is necessary that a processor entering the set of competing processors be uniquely identifiable (such as by a unique processor ID) within the set. Such unique identifiers may be reused to coordinate exclusive access to an alternate shared storage location 224 or an alternate set of identifiers (not shown) may be maintained for access to the alternate shared storage location 224.

A shared storage location may comprise a single unit of storage, a block of storage units, and multiple blocks of storage locally or remotely stored within the system. In an exemplary embodiment, the shared storage location comprises a magnetic disk. Each shared storage location is preferably associated with two "critical storage blocks". A critical storage block is a data structure such as a register, table, or other memory or storage device. The critical storage blocks, described in greater detail, are used to hold and maintain the state information related to the mutex lock in accordance with the present invention.

The shared storage location 222 is associated with the critical storage block 1 ("CS1") 242 and the critical storage block 2 ("CS2") 244. The CS1 242 preferably comprises processor identifier ("ID") field 226 and counter field 228. Likewise, the CS2 244 preferably comprises processor ID field 230 and counter field 232. As shown, additional shared storage locations, such as shared storage location 224, are also associated with two critical storage blocks, for example, CS1 246 and CS2 248.

The critical storage blocks provide not only a means for storing state information to reserve the lock, but also a processor ID field that stores a unique processor ID or a "NotAProcessor code". The processor ID field enables any processor to detect not only that the critical storage block is reserved, but identifies a specific processor that has made the reservation. The NotAProcessor code is simply a predefined reserved code that is not associated with any processor in the set of competing processors. The NotAProcessor code may be stored in a critical storage block, in place of a unique processor ID, to indicate that the storage location is not reserved by any particular processor.

The critical storage block includes a counter field that stores a counter value to provide correctness in cases where a processor crashes and restarts the process. The counter value is incremented each time a specific processor reserves the critical storage block. For example, the first time the critical storage block is reserved the counter value may be set to binary "01". If that processor crashes and upon restarting attempts to reserve the critical storage block again, the counter is incremented to "10". In this manner, other processors will know that even though the first processor has held the lock for a time period longer than the crash detect delay (discussed below), that it has restarted. This prevents the other processors from seizing control of the lock by storing their own processor ID in the processor ID field while the first processor is in fact using the shared resource. It is contemplated that the counter may also be incremented by a processor explicitly even though it has not crashed. This operation enables a processor to extend its hold on the mutex lock. However, this procedure risks locking up the resource indefinitely if the processor continues to assert control over the lock and so may be undesirable in some applications.

The CS1 and CS2 storage blocks may be read from and written to by any processor in the shared set of competing processors according to the mutual exclusion protocol in accordance with the present invention. By coordinating accesses to the CS1 242 and the CS2 244, a processor can establish an exclusive access reservation that can be detected and honored by other competing processors, without data corruption or unacceptable delays related to race conditions or processor crashes.

In an embodiment of the present invention, programmable storage location 250 stores a "Race Wait Delay" value, and storage location 252 stores a Crash Detect Delay value. Preferably, each value is a time value or a clock cycle count. In FIG. 2, the settings are exemplified as being stored in a single pair of storage locations; however, each processor may maintain their own copy of the Race Wait Delay and Crash Detect Delay settings. Preferably, each processor is associated with the same delay settings as every other processor that enters the set of competing processors, although delay settings for individual processors may be tuned in accordance with the present invention.

The Race Wait Delay is used by a processor to cause the processor to wait long enough to allow another processor in the system to read and write to a critical storage block in a manner akin to Fischer's protocol discussed hereinbefore. The first processor preferably writes its processor ID into one critical storage block, and if the contents in the are unchanged after the Race Wait Delay, the processor is assured that another processor has not intervened in the first processor's attempt to reserve the CS (i.e., a race condition does not exist). The range of values for the race wait delay is determined to meet the needs of a particular application as it depends on the particular read and write speeds of the storage device in which the critical storage blcoks are implemented. The race wait delay value may also be determined dynamically by measuring the actual time required by processors to perform the read and write operations and resetting the race wait delay value to the longest time required by any processor.

The Crash Detect Delay value is used by a processor to determine that another processor that had previously reserved or attempted to reserve the shared storage location but has crashed, thereby making the shared storage location available to other ones of the competing processors. The crash detect delay value is long in comparison to the race wait delay. The crash detect delay value may be in the order of microseconds for low latency storage devices such as RAM or in the order of seconds for long latency storage systems such as network storage or disk storage. Because crashes are rare, access requests will seldom incur the crash detect delay and it is of less concern if it is a long value. The Crash Detect Delay is used to recover from the unlikely circumstance where processor read/write times exceed the Race Wait Delay.

In combination, these features of the present invention prevent deadlock in a race condition by using timers with relatively short delays so as to prevent undue burden on every exclusive access reservation. The shorter race wait delay is possible because the race detect mechanism discussed above does not have to detect and resolve crash situations. A large majority of the exclusive access requests will not involve crashes and so will obtain and release the critical blocks with only the race wait delay added to the access latency. Only exceptional conditions will incur the overhead of the longer crash detect delay.

Figure 3:
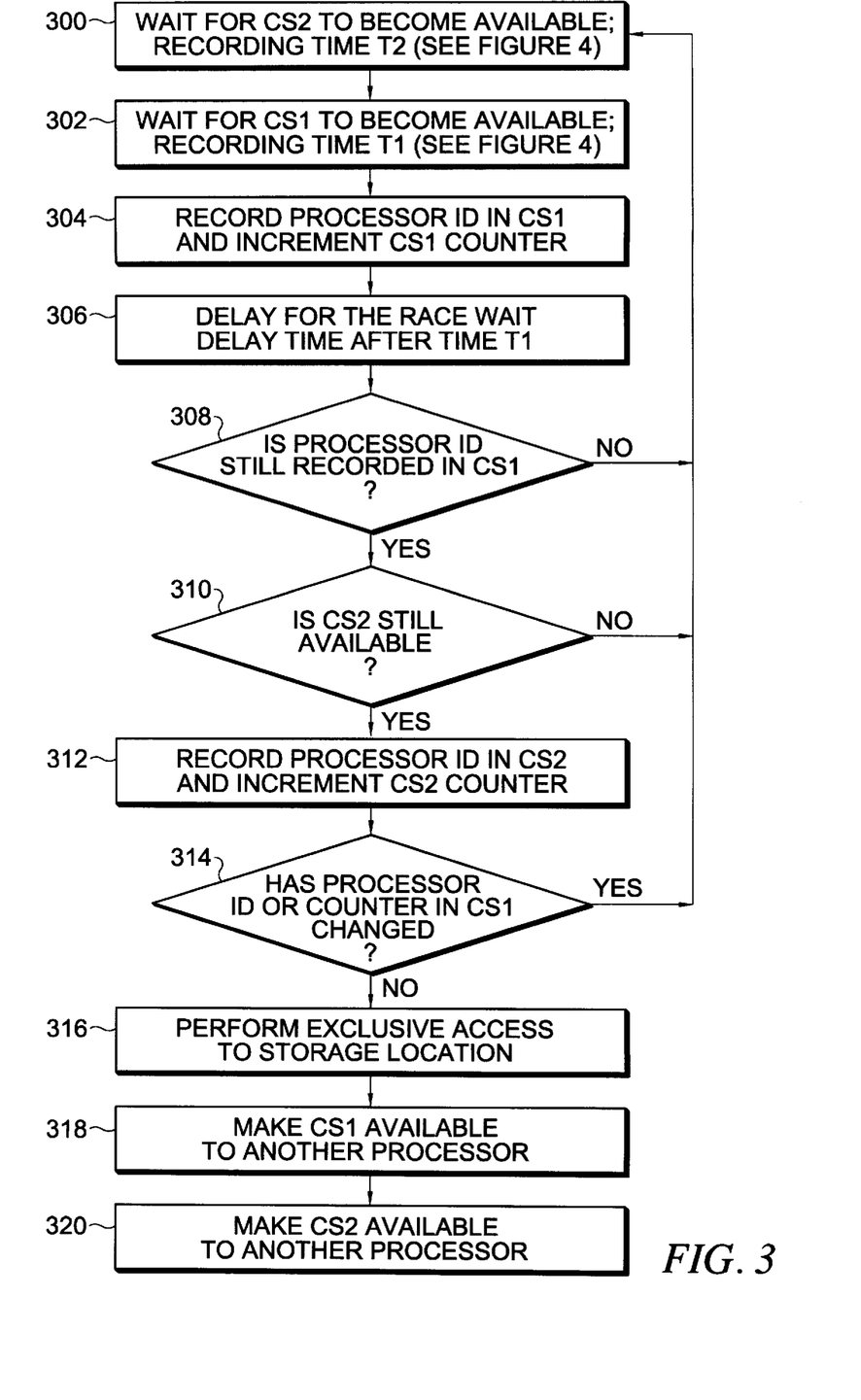
FIG. 3 depicts a flowchart for a method embodiment in accordance with the present invention.

FIG. 3 depicts a flowchart for a method embodiment in accordance with the present invention. The method is designed to take advantage of characteristics of disk devices, although other storage devices having similar properties are also contemplated within the scope of the invention. Specifically, the method depends on single storage location reads and writes having the property of atomicity. Atomicity provides two key properties:

1. Single-block reads or writes succeed or fail as a whole. Partial operations are never performed.
2. The storage system imposes some arbitrary total order upon concurrent operations from competing processors.

Each processor desiring exclusive access to a shared storage location uses the mutual exclusion protocol in accordance with the present invention to obtain exclusive access to the shared storage location. Once a processor gains exclusive access to the shared storage location, then the processor may perform its application-specific work for which exclusive access was required. Such application-specific work may include, for example, a write to the shared storage location without concern for corruption by another processor. Generally, the method ensures that multiple processors do not simultaneously gain access to the shared storage location. Other processors that attempt to gain access to a shared storage location while another processor has exclusive access to the location may be delayed in accordance with the present invention.

Operation 300 of FIG. 3 waits for CS2 to become available. The operation of waiting for a critical storage block to become available is further described with regard to FIG. 4. Operation 302 waits for CS1 to become available. During operation 300, a time T2 is preferably recorded, as exemplified in operations 400 and/or 408 of FIG. 4. Likewise, during operation 302, a time T1 is preferably recorded, as exemplified in operations 400 and/or 408 of FIG. 4. In operation 304, the processor ID of the processor attempting to gain exclusive access to the shared memory location is stored in the processor ID field of CS1 and the counter of CS1 is incremented after CS2 and CS1 were determined to be available in operations 300 and 302.

In operation 306, the method waits for the race wait delay time after time T1 in operation 304. Operation 308 determines whether the processor ID field in CS1 still stores the processor ID of the processor attempting to gain exclusive access in the shared storage location. Unless a race condition exists, the processor ID stored in CS1 will not have changed during the race wait delay. If the processor ID has changed, the method proceeds to operation 300 to restart the processor's attempt to gain exclusive access to the shared storage location. Essentially, the first processor has lost the race. If the processor ID has not changed processing proceeds to operation 310, where it is determined whether CS2 is still available.

Figure 4:
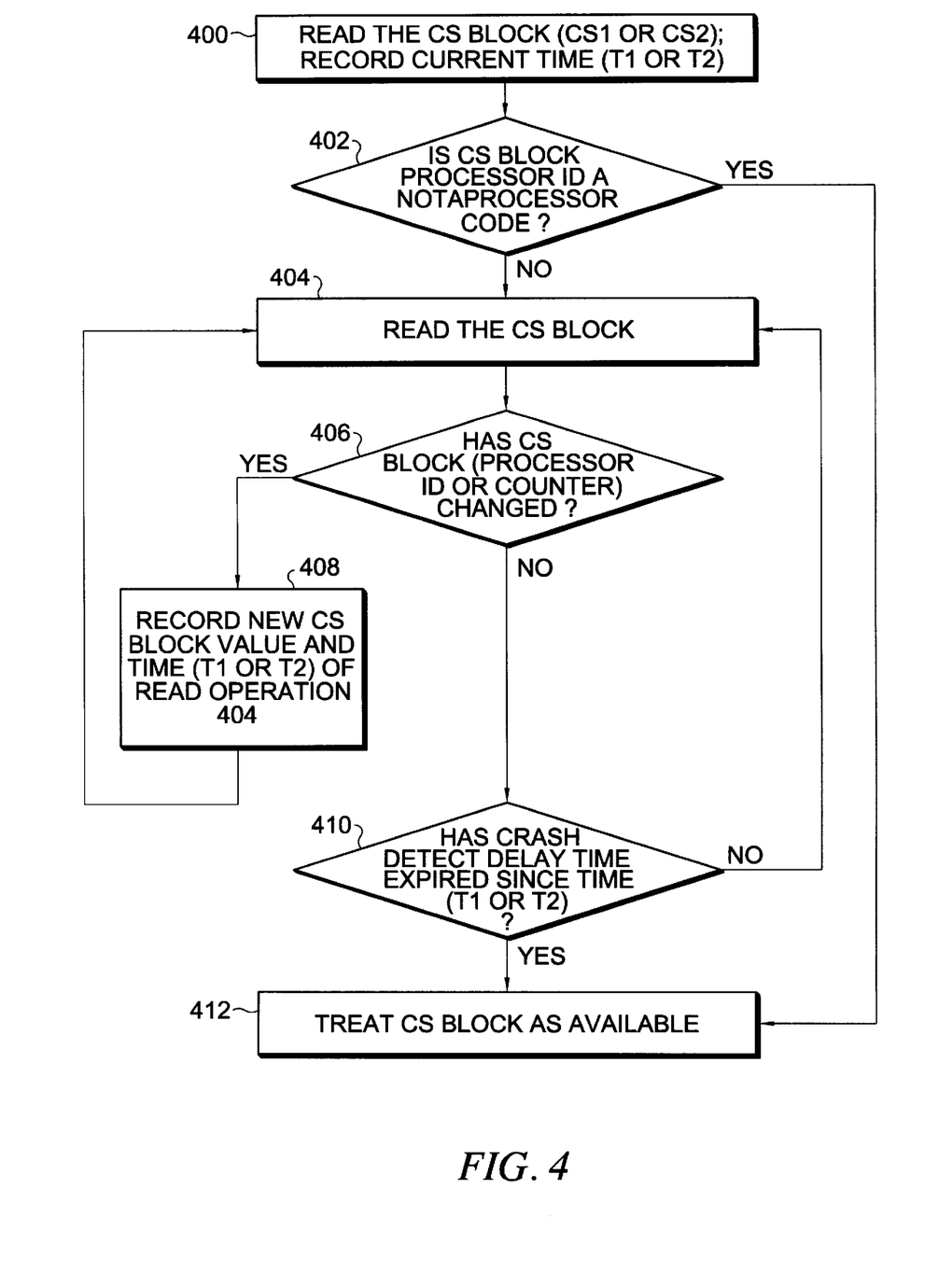
FIG. 4 depicts a detailed flowchart of operations for waiting until a critical storage block becomes available in accordance with the present invention.

CS2 may be determined to be available if the processor ID field of CS2 still contains a NotAProcessor value or the value that was read at time T2 in operation 300, as further detailed in operation 410 of FIG. 4. If CS2 is no longer available, processing proceeds to operation 300 to restart the processor's attempt to gain exclusive access to the shared storage location. Otherwise, processing proceeds to operation 312 where the processor ID of the current processor is stored in the processor ID field of CS2 and the counter of CS2 is incremented.

Operation 314 reads CS1 and determines whether the processor ID or the counter in CS1 has changed from its status as set in operation 304. If so, CS1 is no longer available and processing returns to operation 300 to restart the processor's attempt to gain exclusive access to the shared storage location. Otherwise, the processor gains exclusive access to the shared storage location in operation 316 and may perform its application-specific access without risk of corruption by another processor. At the completion of exclusive access to the shared storage location, CS1 and CS2 are made available to another processor by setting the processor ID field of each critical storage block to the NotAProcessor value and incrementing the counter therein. Generally, the order of operations 318 and 320 are arbitrary and may be reversed without affecting the operation of the method.

FIG. 4 depicts a detailed flowchart of the operations of waiting for a critical storage block to become available (see operations 300 and 302 in FIG. 3). Operation 400 reads the data field(s) the CS of interest (CS1 or CS2), recording the time (T1 or T2) of the read operation. The time (T1 or T2) may correspond to an actual time or to some equivalent means of measuring time, such as a cycle index. Alternately, the expiration of the Race Wait Delay or Crash Detect Delay may also be determined by the expiration of a timer, a counter, or other similar means. Operation 402 determines whether the processor ID in the CS block is a NotAProcessor code. If so, the CS Block is considered to be available in operation 412. Otherwise, processing proceeds to operation 404, where the CS Block is re-read.

In operation 406, if the contents of the CS Block, as read in operation 404, remains unchanged from the contents read in operation 400, processing proceeds to operation 410 to determine whether the Crash Detect Delay has expired since recorded time (T1 or T2). The expiration of the Crash Detect Delay after (T1 or T2) preferably indicates that the processor corresponding to the processor ID in the CS Block has crashed and that the CS Block is considered available in operation 412. If, however, operation 406 determines that the contents of the CS Block have changed, then the new value or values in the CS Block is recorded, and the time of the previous read operation 404 is recorded as T1 or T2. Thereafter, processing returns to perform the read operation 404 again.

Figure 5:
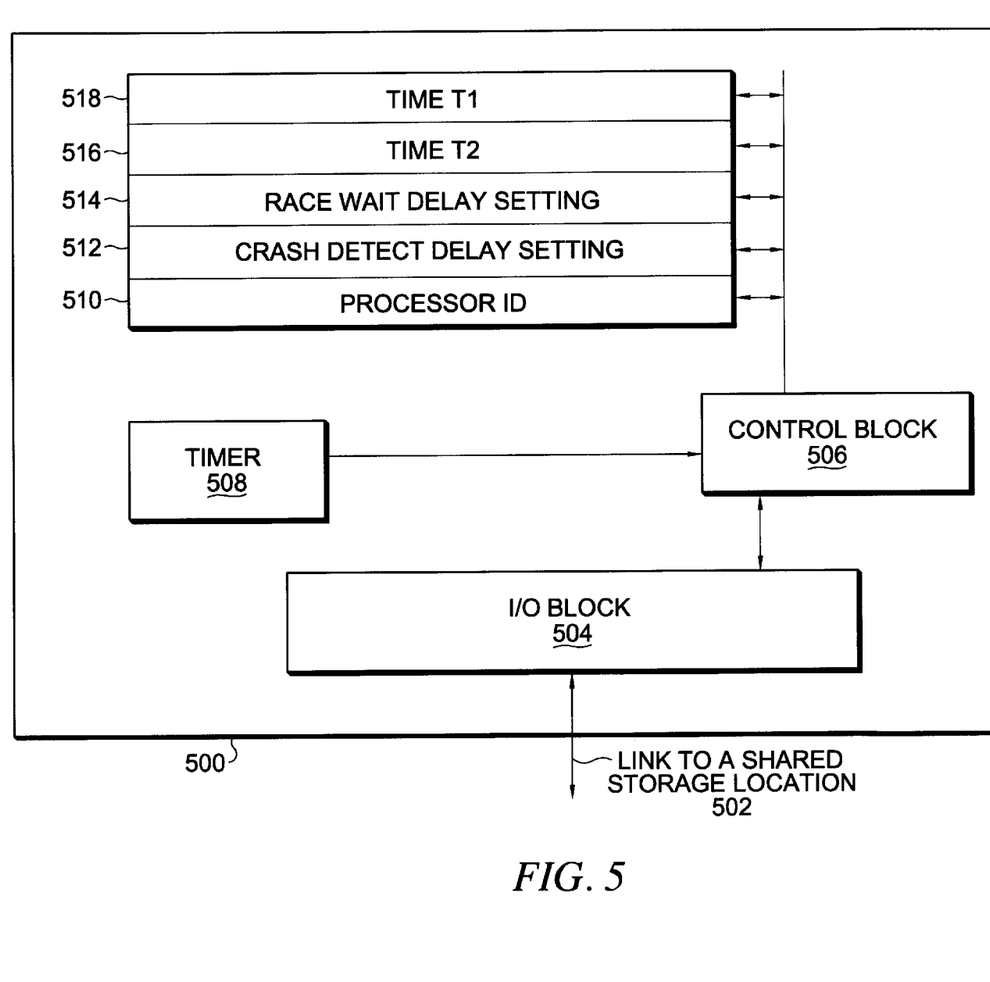
FIG. 5 depicts an exemplary embodiment of a processor in accordance with the present invention.

FIG. 5 depicts an exemplary embodiment of a processor in accordance with the present invention. Block 500 represents a processor, that may be integrated into a single chip or be a combination of multiple logic devices. Alternately, processor 500 may also be a microprocessor, a scripts processor, or other processor circuitry controlled by software. Generally, processor 500 comprises circuitry that implements a state machine for providing exclusive access to a shared storage location.

A link 502 preferably couples the processor 500 to a shared storage location. The link may also couple the processor 500 to other competing processors. An I/O block 504 sends and receives data from the link 502 and provides an interface to a control block 506 to operate on such data. The control block 506 is configured to implement the operations of FIGS. 3 and 4.

In the illustrated embodiment, the control block 506 coordinates access to a shared memory location (not shown) with other processors (not shown) by following a shared exclusive access algorithm. In this manner, competing processors reserve access to a shared memory location and honor the reservations of other competing processors. The control block 506 is coupled to source locations 510, 512, 514, 516, and 518 for use during an attempt to gain exclusive access to a shared memory location. These storage locations 510, 512, 514, 516 and 518 are illustrated as being disposed within processor 500; however, such locations may exist locally or remotely from processor 500 in accordance with the present invention. The control block 506 may also be coupled to a control buffer that stores instructions for directing the control block 506 to secure exclusive access to a shared storage location. The timer 508 is an optional means for determining time between read and write operations of control block 506. Alternately, other timing-related parameters may be used, including a cycle count.

While the method and program instructions disclosed herein have been described and shown with reference to particular operations performed in a particular order, it will be understood that these operations may be combined, sub-divided, or re-ordered to form an equivalent method or program without departing from the teachings of the present invention. Accordingly, unless specifically indicated herein, the order and grouping of the ordering is not a limitation of the present invention.

Moreover, while there have been described herein the principles of the present invention in conjunction with specific system, method, and program implementations, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and that may be used instead of or in addition to features already described herein. Moreover, the system and method disclosed may be implemented in hardware or software in accordance with the present invention. The applicants hereby reserve the right to formulate new claims to such features and/or combinations of such features during the prosecution of the present application or of any further application derived thereof.

What is claimed is:

1. A method for providing exclusive access to a shared storage device for a first processor in a system having a plurality of processors, the method comprising:

creating a first critical storage block and a second critical storage block associated with the shared storage device;

providing a unique processor ID for each of the plurality of processors;

determining when the first critical block becomes available;

determining a time point at which the second critical storage block becomes available;

after both the first and second critical blocks become available, storing a processor identifier associated with the first processor in the second critical storage block;

after a preselected delay from the time point, determining whether the processor identifier remains stored in the second critical block;

in response to determining that the processor identifier remains stored in the second critical storage block, checking to determine whether the processor identifier remains in the first critical storage block; and once the process identifier is stored in both the first and second critical storage blocks, providing the first processor with exclusive access to the shared storage location.

2. The method of claim 1 wherein the step of determining when the first critical block becomes available comprises:

reading data from the first critical storage block;

determining whether the read data indicates that the critical storage block is available;

when the read data comprises a processor ID, determining whether the processor ID has changed since the most recent processor ID read from the first critical storage block.

3. The method of claim 1 further comprising incrementing a counter of the first critical storage block, after the first critical storage block and the second critical storage block are determined to be available.

4. The method of claim 1 further comprising incrementing a counter of the second critical storage block, if the processor identifier remains stored in the first critical storage block for a duration of a race wait delay after the operation of storing the processor identifier in the first critical storage block.

5. The method of claim 1 further comprising: recording a NotAProcessor code in the first critical storage block and the second critical storage block to terminate exclusive access to the storage location.

6. The method of claim 1 wherein the waiting operation comprises determining that the second critical storage block is available if the second critical storage block contains a NotAProcessor code.

7. The method of claim 1 wherein the waiting operation comprises:
reading the second critical storage block at a first time;
reading the second critical storage block at a second time; and
determining that the second critical storage block is available if the read operations provide a same read result and a difference between the second time and the first time is less than a preselected crash detect delay.

8. The method of claim 1 wherein the waiting operation comprises determining that the first critical storage block is available if the first critical storage block contains a NotAProcessor code.

9. The method of claim 1 wherein the waiting operation comprises:
reading the first critical storage block at a first time;
reading the first critical storage block at a second time; and
determining that the first critical storage block is available if the read operations provide a same read result and a difference between the second time and the first time exceeds a crash detect delay.

10. The method of claim 1 further comprising defining the race wait delay to equal or exceed a duration required for a second of the processors to read and write to the shared storage location.

11. The method of claim 1 further comprising providing a unique identifier to each of the plurality of processors.

12. A program storage medium, readable by a computer, tangibly embodying a program of instructions executable by the computer for providing exclusive access to a shared storage location for a first processor in a system having a plurality of processors, the program comprising instructions for:
waiting for a first critical storage block and a second critical storage block to be available, both critical storage blocks being associated with the shared storage location;
storing a processor identifier associated with the first processor in the first critical storage block, after the first critical storage block and the second critical storage block are available;
storing the processor identifier in the second critical storage block, if the processor identifier remains stored in the first critical storage block for a duration of a race wait delay and if the second critical storage block is available; and
providing the first processor with access to the shared storage location, if the processor identifier remains stored in the first critical storage block after the operation of storing the processor identifier in the second critical storage block.

13. The program storage medium of claim 12 wherein the waiting instructions comprise instructions for:
waiting for the second critical storage block to be available; and
waiting for the first critical storage block to be available, after the operation of waiting for the second critical storage block to be available.

14. The program storage medium of claim 12 further comprising instructions for incrementing a counter of the first critical storage block, after the first critical storage block and the second critical storage block are determined to be available.

15. The program storage medium of claim 12 further comprising instructions for incrementing a counter of the second critical storage block, if the processor identifier remains stored in the first critical storage block for a duration of a race wait delay after the operation of storing the processor identifier in the first critical storage block.

16. The program storage medium of claim 12 further comprising instructions for recording a NotAProcessor code in the first critical storage block and the second critical storage block to terminate exclusive access to the storage location.

17. The program storage medium of claim 12 wherein the waiting instructions comprise instructions for determining that the second critical storage block is available if the second critical storage block contains a NotAProcessor code.

18. The program storage medium of claim 12 wherein the waiting instructions comprise instructions for:
reading the second critical storage block at a first time;
reading the second critical storage block at a second time; and
determining that the second critical storage block is available if the read operations provide a same read result and a difference between the second time and the first time exceeds a crash detect delay.

19. The program storage medium of claim 12 wherein the waiting instructions comprise instructions for determining that the first critical storage block is available if the first critical storage block contains a NotAProcessor code.

20. The program storage medium of claim 12 wherein the waiting instructions comprise instructions for:
reading the first critical storage block at a first time;
reading the first critical storage block at a second time; and
determining that the first critical storage block is available if the read operations provide a same read result and a difference between the second time and the first time exceeds a crash detect delay.

21. The program storage medium of claim 12 wherein the waiting instructions comprise instructions for defining the race wait delay to equal or exceed a duration required for a second of the processors to read and write to the shared storage location.

22. A processor for obtaining exclusive access to a storage location, the processor comprising:
a storage device for storing a value representing a race wait delay setting;
an I/O block interfacing the processor with the storage location; and
a control block coupled to the storage device and the storage location and being configured to:

wait for a first critical storage block and a second critical storage block associated with the storage location to be available;

store a unique processor identifier associated with the processor in the first critical storage block, after the first critical storage block and the second critical storage block are available;

store the processor identifier in the second critical storage block, if the processor identifier remains stored in the first critical storage block for a duration of a race wait delay and if the second critical storage block remains available; and access the storage location, if the processor identifier remains stored in the first critical storage block after storing the processor identifier in the second critical storage block.

23. The processor of claim 22 wherein the control block is coupled to a control buffer to receive instructions for obtaining exclusive access to the storage location.

24. The processor of claim 22 wherein the storage device stores a crash detect delay setting for determining whether the first critical storage block or the second critical storage block is available.

25. The processor of claim 22 wherein the storage device stores a read time while waiting for one of the first critical storage block or second critical storage block to become available.

26. The processor of claim 22 wherein the control block honors an exclusive access reservation of another competing processor.

27. A computer system comprising:
a storage device for storing a value representing a race wait delay setting;
a shared storage location associated with a first critical storage block and a second critical storage block; and
a processor coupled to the storage device and the shared storage location, being configured to:
wait for the first critical storage block and the second critical storage block to be available;
store the unique processor identifier in the first critical storage block, after the first critical storage block and the second critical storage block are available;
store the processor identifier in the second critical storage block, if the processor identifier remains stored in the first critical storage block for a duration of a race wait delay and if the second critical storage block remains available; and
access the storage location, if the processor identifier remains stored in the first critical storage block after storing the processor identifier in the second critical storage block.

28. The computer system of claim 27 wherein the control block is coupled to a control buffer to receive instructions for obtaining exclusive access to the storage location.

29. The computer system of claim 27 wherein the storage device stores a crash detect delay setting for determining whether the first critical storage block or the second critical storage block is available.

30. The computer system of claim 27 wherein the storage device stores a read time while waiting for one of the first critical storage block or second critical storage block to become available.

31. A system for providing exclusive access to the shared storage location, the system comprising:
a storage device for storing a value representing a race wait delay setting;
a shared storage location associated with a first critical storage block and a second critical storage block;
a plurality of processors coupled to the at least one storage device and the shared storage location, each processor having a unique processor identifier and being configured to:
wait for the first critical storage block and the second critical storage block to be available;
store the unique processor identifier in the first critical storage block, after the first critical storage block and the second critical storage block are available;
store the processor identifier in the second critical storage block, if the processor identifier remains stored in the first critical storage block for a duration of a race wait delay and if the second critical storage block remains available; and
access the storage location, if the processor identifier remains stored in the first critical storage block after storing the processor identifier in the second critical storage block.

32. The system of claim 31 wherein the storage device stores a crash detect delay for determining whether the first critical storage block or the second critical storage block is available.

33. The system of claim 31 wherein the storage device stores a read time while waiting for one of the first critical storage block or second critical storage block to become available.

34. The system of claim 31 wherein the control block honors an exclusive access reservation of another competing processor.

35. A system for providing exclusive access to the shared storage location, the system comprising:
means for waiting for a first critical storage block and a second critical storage block to be available, both critical storage blocks being associated with the shared storage location;
means for storing a processor identifier associated with the first processor in the first critical storage block, after the first critical storage block and the second critical storage block are available;
means for storing the processor identifier in the second critical storage block, if the processor identifier remains stored in the first critical storage block for a duration of a race wait delay and if the second critical storage block is available; and
means for accessing the shared storage location, if the processor identifier remains stored in the first critical storage block after the operation of storing the processor identifier in the second critical storage block.

* * * * *